United States Patent
Monzawa

(10) Patent No.: US 8,194,545 B2
(45) Date of Patent: Jun. 5, 2012

(54) PACKET PROCESSING APPARATUS

(75) Inventor: Takashi Monzawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 12/641,591

(22) Filed: Dec. 18, 2009

(65) Prior Publication Data

US 2010/0091785 A1    Apr. 15, 2010

Related U.S. Application Data

(63) Continuation of application No. PCT/JP2007/064734, filed on Jul. 27, 2007.

(51) Int. Cl.
    H04L 1/00      (2006.01)
    H04L 12/56     (2006.01)
    H04L 12/54     (2006.01)
(52) U.S. Cl. .................. 370/232; 370/412; 370/429
(58) Field of Classification Search .................. 370/229, 370/232, 412, 429
    See application file for complete search history.

(56) References Cited

U.S. PATENT DOCUMENTS

| | | | |
|---|---|---|---|
| 6,333,917 B1* | 12/2001 | Lyon et al. | 370/236 |
| 6,990,529 B2* | 1/2006 | Yang et al. | 709/235 |
| 7,035,216 B2 | 4/2006 | Kikuchi et al. | |
| 7,139,281 B1* | 11/2006 | Bodin | 370/412 |
| 7,224,670 B2* | 5/2007 | Jeffries et al. | 370/231 |
| 2004/0125815 A1* | 7/2004 | Shimazu et al. | 370/411 |
| 2004/0179473 A1* | 9/2004 | Thibodeau et al. | 370/229 |
| 2006/0039374 A1* | 2/2006 | Belz et al. | 370/389 |
| 2009/0196194 A1* | 8/2009 | Paloheimo et al. | 370/252 |

FOREIGN PATENT DOCUMENTS

| | | |
|---|---|---|
| JP | 2001-111556 | 4/2001 |
| JP | 2002-330165 | 11/2002 |
| JP | 2004-104417 | 4/2004 |
| JP | 2005-94392 | 4/2005 |

OTHER PUBLICATIONS

International Search Report dated Aug. 21, 2007, from the corresponding International Application.
Takashi Osanai, et al. "Effectiveness of Drop Precedence based on Instantaneous Queue Size for Priority Discarding UDP Flow Packets" The Institute of Electronics, Information and Communication Engineers, Technical Report of IEICE, Feb. 27, 2004, pp. 83-88.

* cited by examiner

Primary Examiner — Man Phan
Assistant Examiner — Ryan Kavleski
(74) Attorney, Agent, or Firm — Fujitsu Patent Center

(57) ABSTRACT

A packet processing apparatus includes a packet buffer with a queue for storing packets. An actual queue length/position discriminator acquires, at every sampling period, the latest actual queue length indicating the occupancy status of the queue, determines the positional relationship of the actual queue length to a random early detection interval, and outputs the positional relationship as position information. A discard probability computation processor calculates, at every sampling period, a packet discard probability based on the position information. A packet discard processor discards, at every sampling period and in accordance with the discard probability, packets that are not yet stored in the queue. If it is judged from the position information that the actual queue length is within the random early detection interval, the discard probability computation processor calculates an average queue length, and then calculates the discard probability from the ratio of a discard target to a reception target.

10 Claims, 16 Drawing Sheets

25a COMPUTATION RESULT HOLDING TABLE

| No. of bits | 2bit | 1bit | 1bit | 1bit | 24bit | 1bit | 14bit | 15bit | 15bit | 16bit |
|---|---|---|---|---|---|---|---|---|---|---|
| default | — | 0 | 0 | 0 | All 0 | 0 | All 0 | All 0 | All 0 | All 0 |
| Add | PTY | RED on/off | Pass all | Discard all | Average queue length | Discard flag | Corrected discard target | Corrected reception target | Discard count | Reception count |
| #0 | PTY (2) | 1 | 0 | 0 | Average queue length | 1 | Corrected discard target | Corrected reception target | Discard count | Reception count |
| #1 | PTY (2) | 1 | 1 | 0 | Average queue length | 0 | Corrected discard target | Corrected reception target | Discard count | Reception count |
| ...... | ...... | ...... | ...... | ...... | ...... | ...... | ...... | ...... | ...... | ...... |
| #31 | PTY (2) | 0 | 0 | 0 | Average queue length | 0 | Corrected discard target | Corrected reception target | Discard count | Reception count |
| ...... | ...... | ...... | ...... | ...... | ...... | ...... | ...... | ...... | ...... | ...... |

PACKET PROCESSING APPARATUS

This application is a continuing application, filed under 35 U.S.C. §111(a), of International Application PCT/JP2007/064734, filed Jul. 27, 2007.

FIELD

The embodiments discussed herein are related to packet processing apparatus.

BACKGROUND

Packets with various purposes are carried over networks and have their communication quality determined by QoS (Quality of Service) control according to traffic types. The QoS control denotes techniques that enable effective use of limited network resources, such as line bandwidth and queue buffer capacity.

As one of such QoS control techniques, a packet congestion avoidance algorithm called RED (Random Early Discarding (Detection)) has been known. The RED is a technique wherein packets arriving at a network device are stored in a queue, the amount of data stored in the queue is periodically monitored to calculate a queue elongation trend (increase/decrease in the amount of data stored in the queue), and before the queue overflows, arrival packets are discarded at random with a probability set as needed, to avoid the overflow of the queue. The RED algorithm is especially effective in processing Ethernet (registered trademark) frames and the like, which are random-length packets, rather than fixed-length packets.

As conventional RED-based packet discarding techniques, a technique has been known wherein an approximate discard probability curve is generated to perform congestion control so that the packet discarding process can be controlled by hardware (Japanese Laid-open Patent Publication No. 2005-94392 (paragraph nos. [0015] to [0018], FIG. 1)).

In the RED-based packet discarding process, packets are discarded in accordance with a discard probability curve which is indicative of an arrival packet discard probability dependent on the degree of elongation of the queue length. As a result of the recent tendency toward higher-speed, larger-capacity networks, there has been a demand for techniques capable of speeding up the packet discarding process.

Generally, in the conventional RED-based packet discarding process, hardware and firmware (software) are used in combination to execute the process. With such configuration, however, the communication time necessary for the communication between the hardware and the firmware poses an impediment to higher-speed processing. Also, since multiplications, divisions and like operations are performed by the firmware with the use of a microcomputer or a DSP (Digital Signal Processor), it is not possible to carry out packet-by-packet discarding at high speed, posing a problem that the processing speed is not high enough to support high-speed networks.

In the aforementioned conventional technique (Japanese Laid-open Patent Publication No. 2005-94392), on the other hand, the RED-based packet discarding process is implemented by hardware, thus enabling high-speed random discarding of packets. However, for convenience of circuit design, the vertical and horizontal axes of the discard probability curve are divided using binary numbers to generate a stepwise discard probability curve, and packets are discarded in accordance with the approximated discard probability curve. Thus, compared with the packet discarding process using the original linear discard probability curve, a problem arises in that the discarding error is significantly large.

SUMMARY

According to one aspect of the present invention, a packet processing apparatus for performing a packet discarding process includes a packet buffer provided with a queue for storing packets, an actual queue length/position discriminator configured to acquire, at every sampling period, an actual queue length indicating an occupancy status of the queue storing packets, determine a positional relationship of the actual queue length relative to a random early detection interval indicative of a range between a minimum threshold, which is a minimum actual queue length value beyond which packet discarding is started, and a maximum threshold, which is a maximum actual queue length value beyond which all packets are discarded, and output the determined positional relationship as position information, a discard probability computation processor configured to calculate, at every sampling period, a packet discard probability based on the position information, and a packet discard processor configured to discard, at every sampling period and in accordance with the discard probability, packets that are not yet stored in the queue, wherein, if the actual queue length is not greater than the maximum threshold and is within the random early detection interval, the discard probability computation processor calculates an average queue length, which indicates an average occupancy status of the queue, then obtains a discard target as a target data amount of packets to be discarded and a reception target as a target data amount of packets received at a sampling time, and calculates the discard probability from a ratio of the discard target to the reception target.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 10:
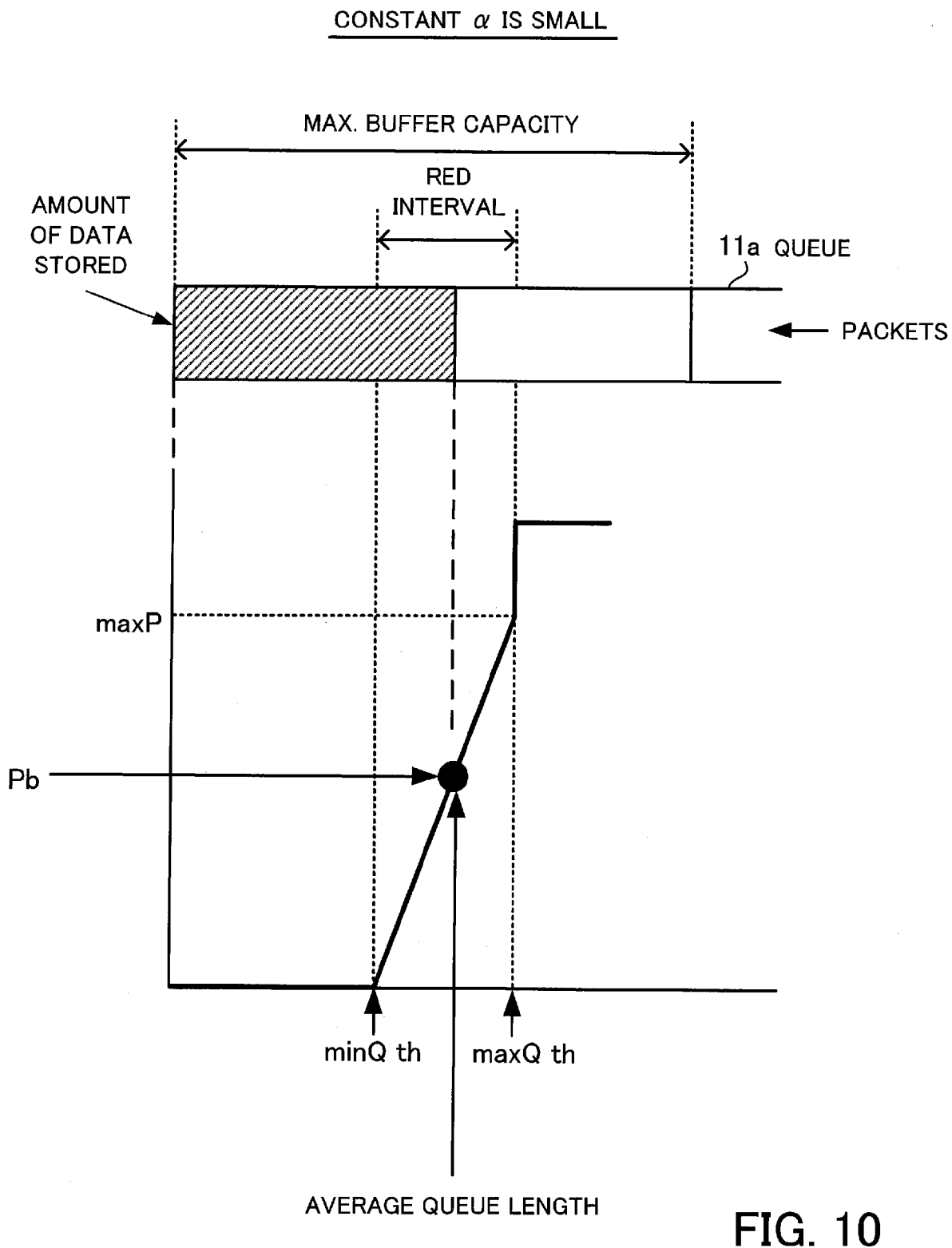
Figure 11:
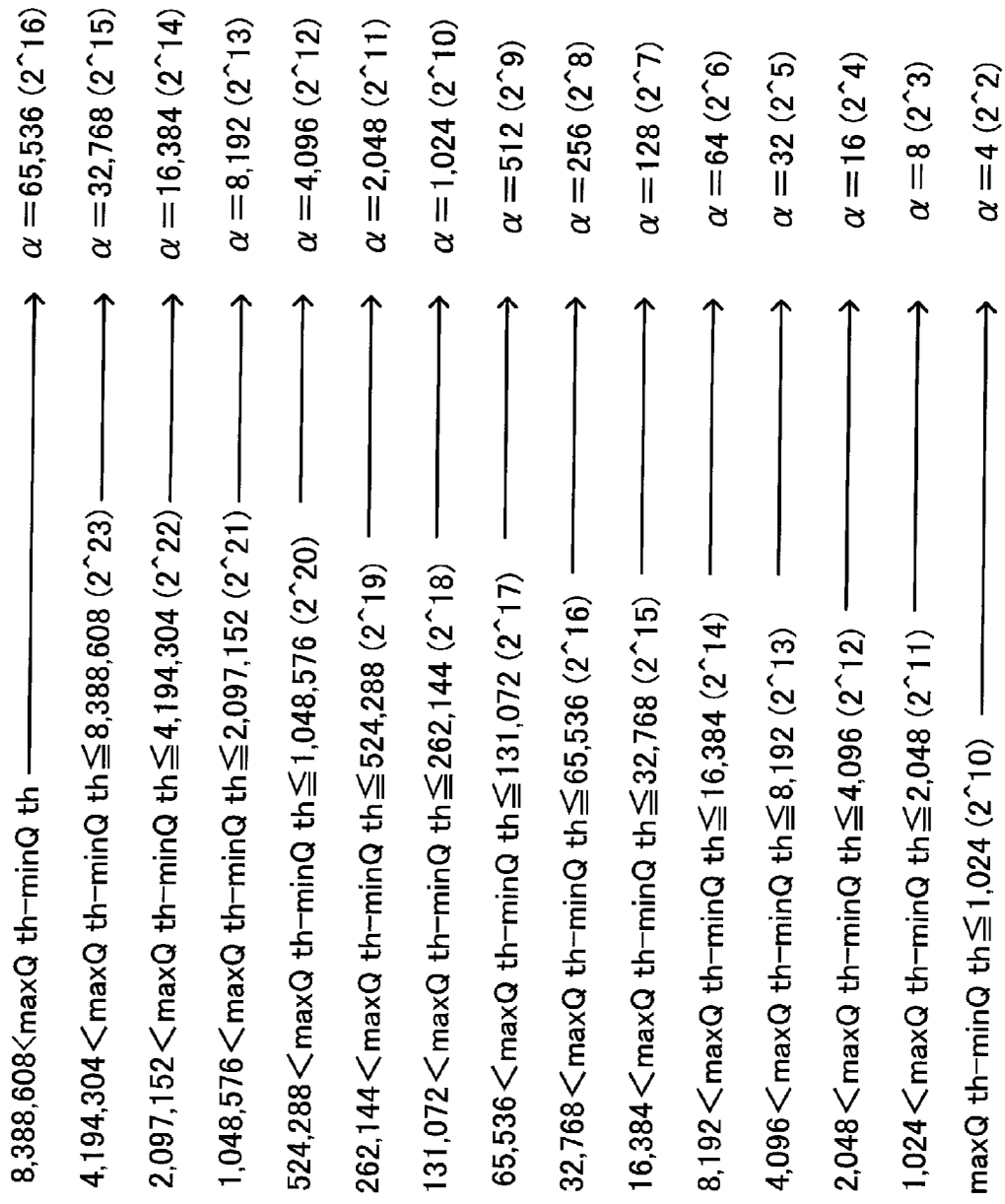
Figure 12:
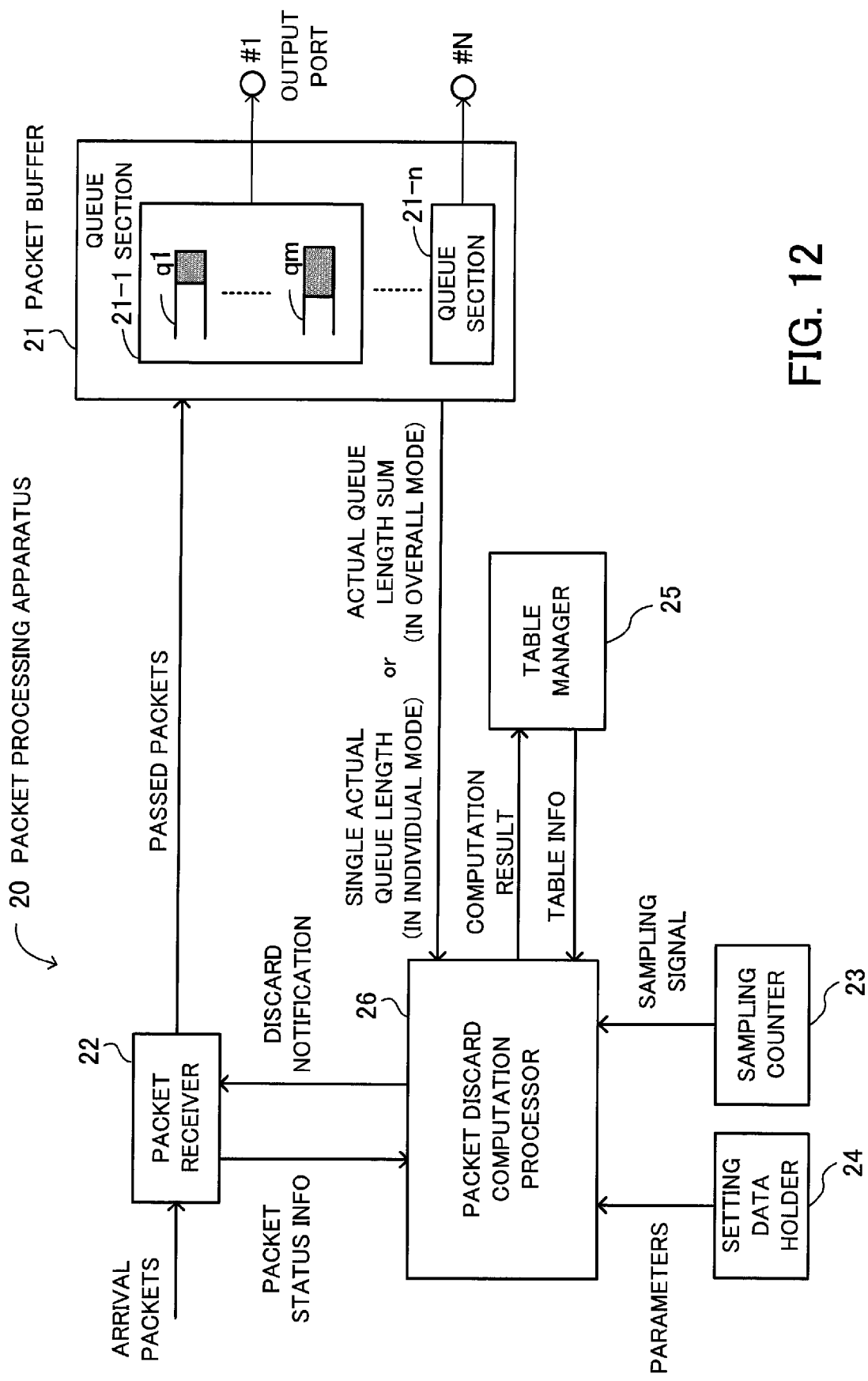
Figure 14:
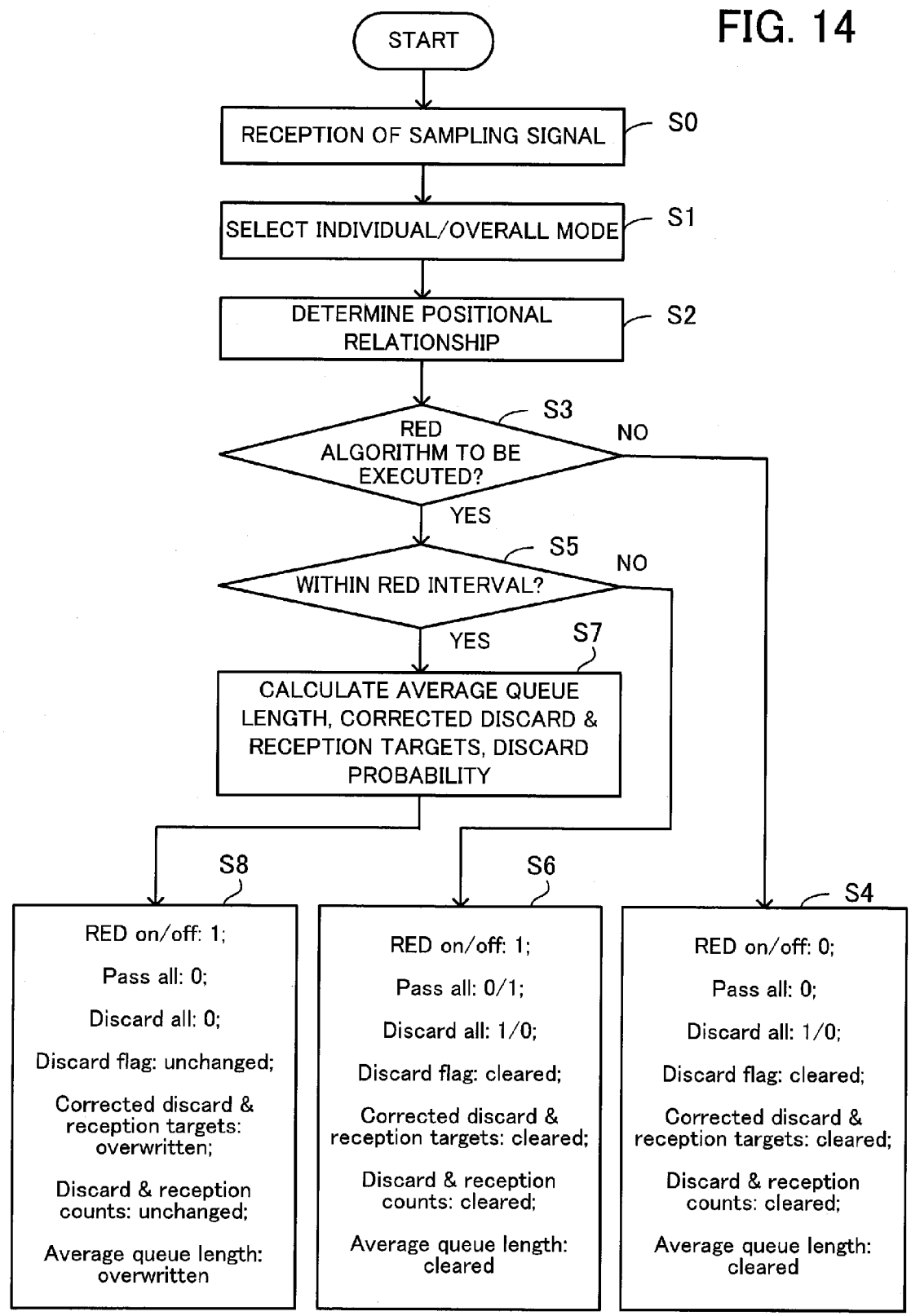
Figure 15:
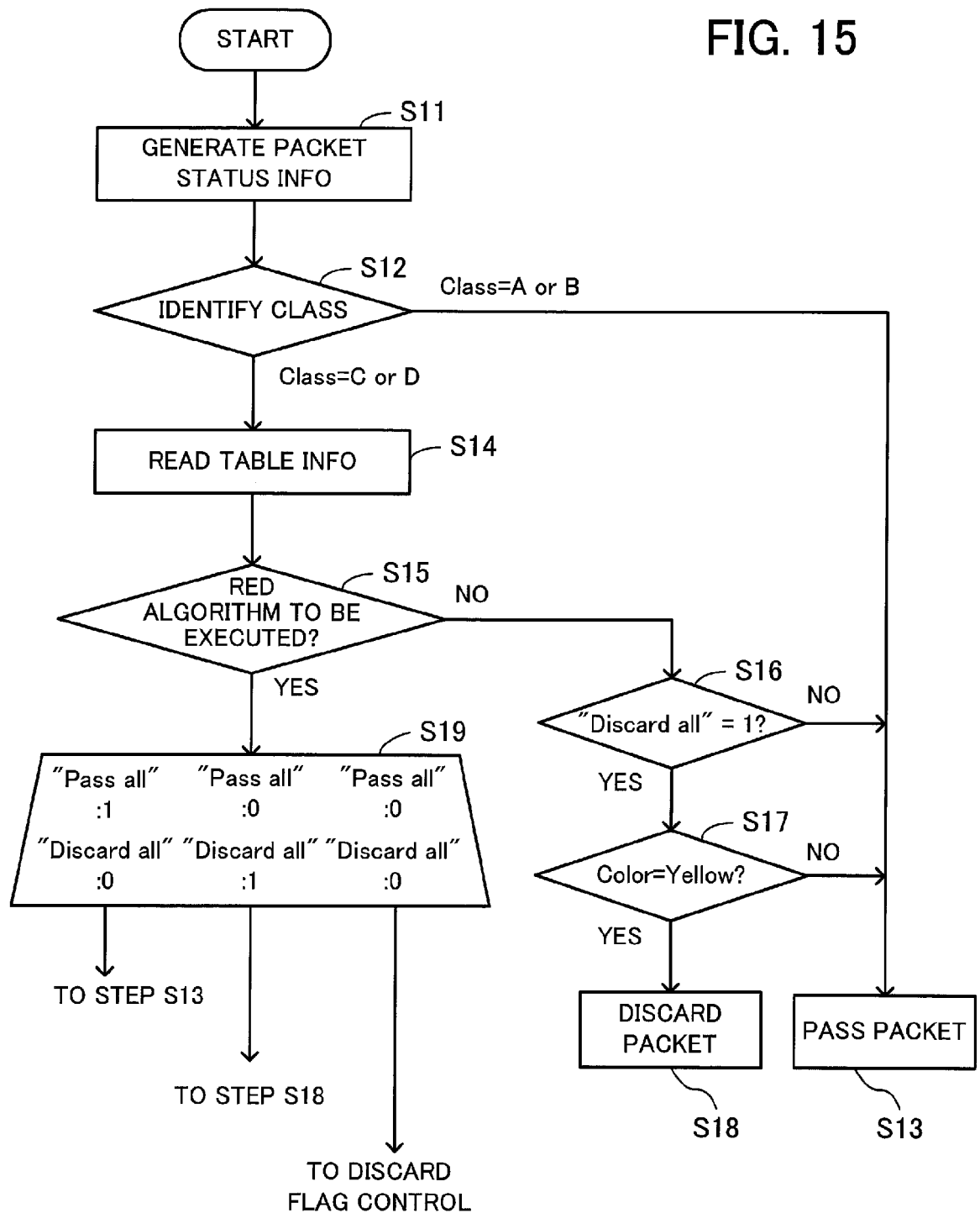
Figure 16:
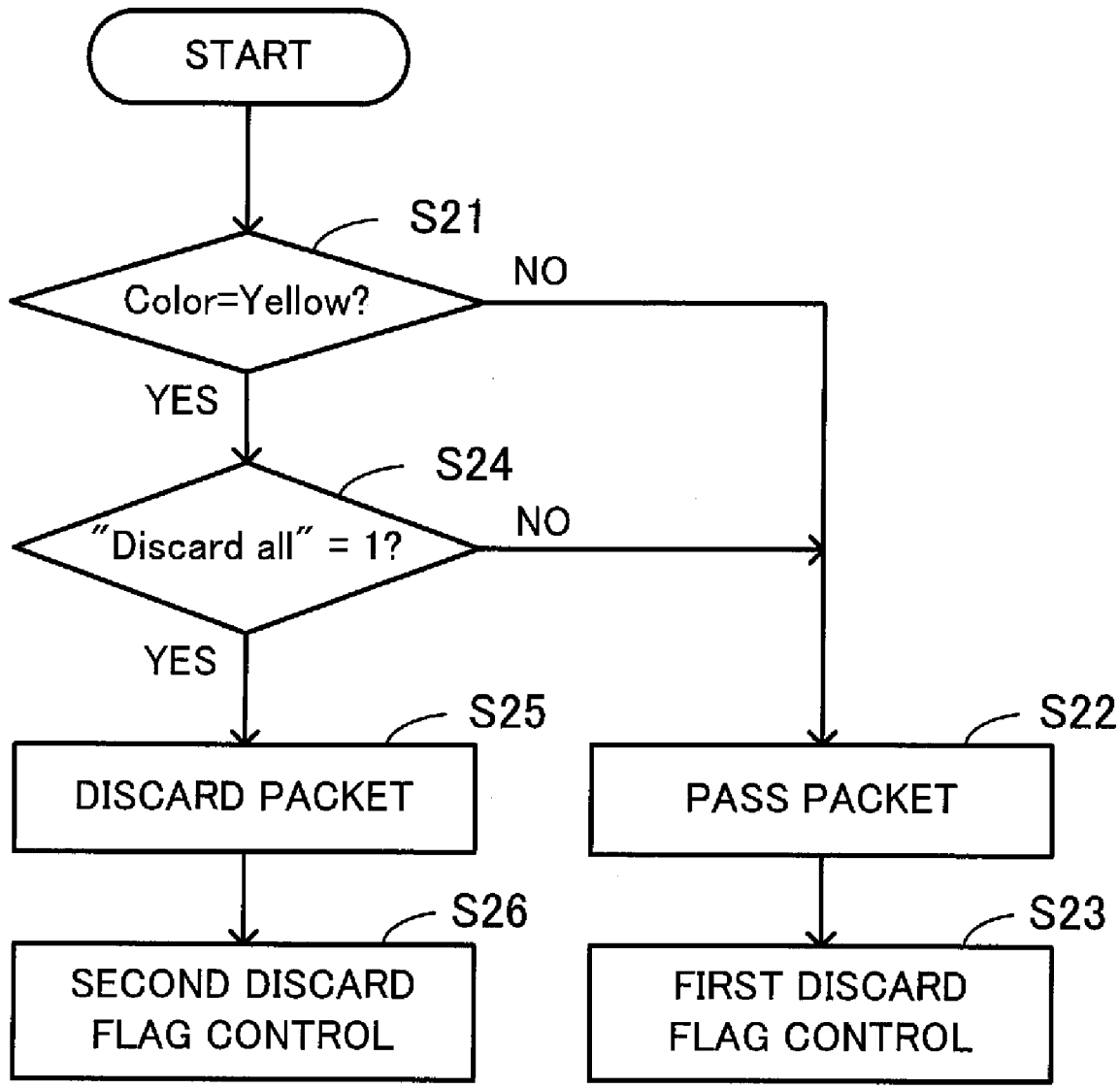

FIG. 10 also illustrates the relationship between the magnitude of the constant and the length of the RED interval;

FIG. 11 illustrates an example of how the constant is set;

FIG. 12 illustrates the configuration of a packet processing apparatus;

FIG. 13 illustrates an exemplary arrangement of a computation result holding table;

FIG. 14 is a flowchart illustrating a whole operation of a packet discard computation processor, including position discrimination and computation;

FIG. 15 is a flowchart illustrating a process executed on arrival of a packet; and FIG. 16 is a flowchart illustrating an operation of discard flag control.

DESCRIPTION OF EMBODIMENT(S)

Figure 1:
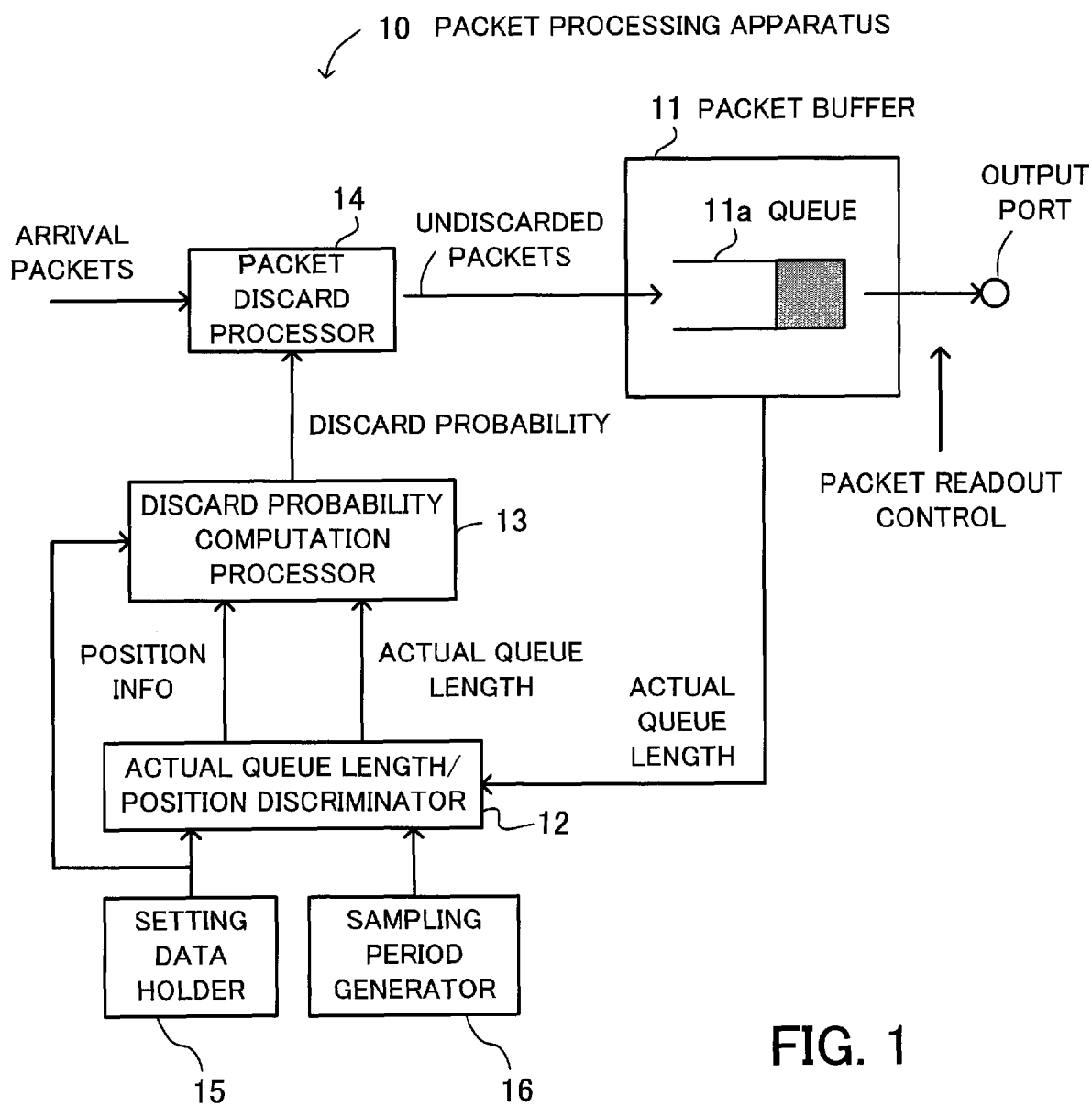
FIG. 1 illustrates the principle of a packet processing apparatus.

Embodiments of the present invention will be described below with reference to the accompanying drawings. FIG. 1 illustrates the principle of a packet processing apparatus. The packet processing apparatus 10 comprises a packet buffer 11, an actual queue length/position discriminator 12, a discard probability computation processor 13, a packet discard processor 14, a setting data holder 15 and a sampling period generator 16, and is an apparatus (packet receiving-side apparatus) for performing a packet discarding process by using a RED algorithm (the packet discarding process using the RED algorithm is hereinafter referred to also as RED process). In Ethernet, the term "frame" is commonly used, but in the following description, the term "packet" is used throughout for the sake of consistency.

The packet buffer 11 is provided with a queue 11a for storing packets. Although FIG. 1 illustrates only one queue 11a, in practice a plurality of queues are provided for each of output ports.

The actual queue length/position discriminator acquires, at every sampling period, an actual queue length which indicates the occupancy status of the queue 11a storing packets. Also, the actual queue length/position discriminator 12 determines the positional relationship of the actual queue length relative to a random early detection interval (hereinafter RED interval) indicative of the range between a minimum threshold, which is a minimum actual queue length value beyond which packet discarding is started, and a maximum threshold, which is a maximum actual queue length value beyond which all packets are discarded, and outputs the determined positional relationship as position information. The RED interval denotes an interval in which packets are probabilistically (randomly) discarded before the packet storage space (room) of the queue 11a runs out.

The discard probability computation processor 13 calculates, at every sampling period, a packet discard probability based on the position information. In accordance with the calculated discard probability, the packet discard processor 14 discards, at every sampling period, packets that are not yet stored in the queue 11a.

The setting data holder 15 holds individual parameters (minimum and maximum thresholds, values necessary for the discard probability calculation, etc.) sent from the host. The sampling period generator 16 is a counter for generating a sampling period set as needed.

Figure 6:
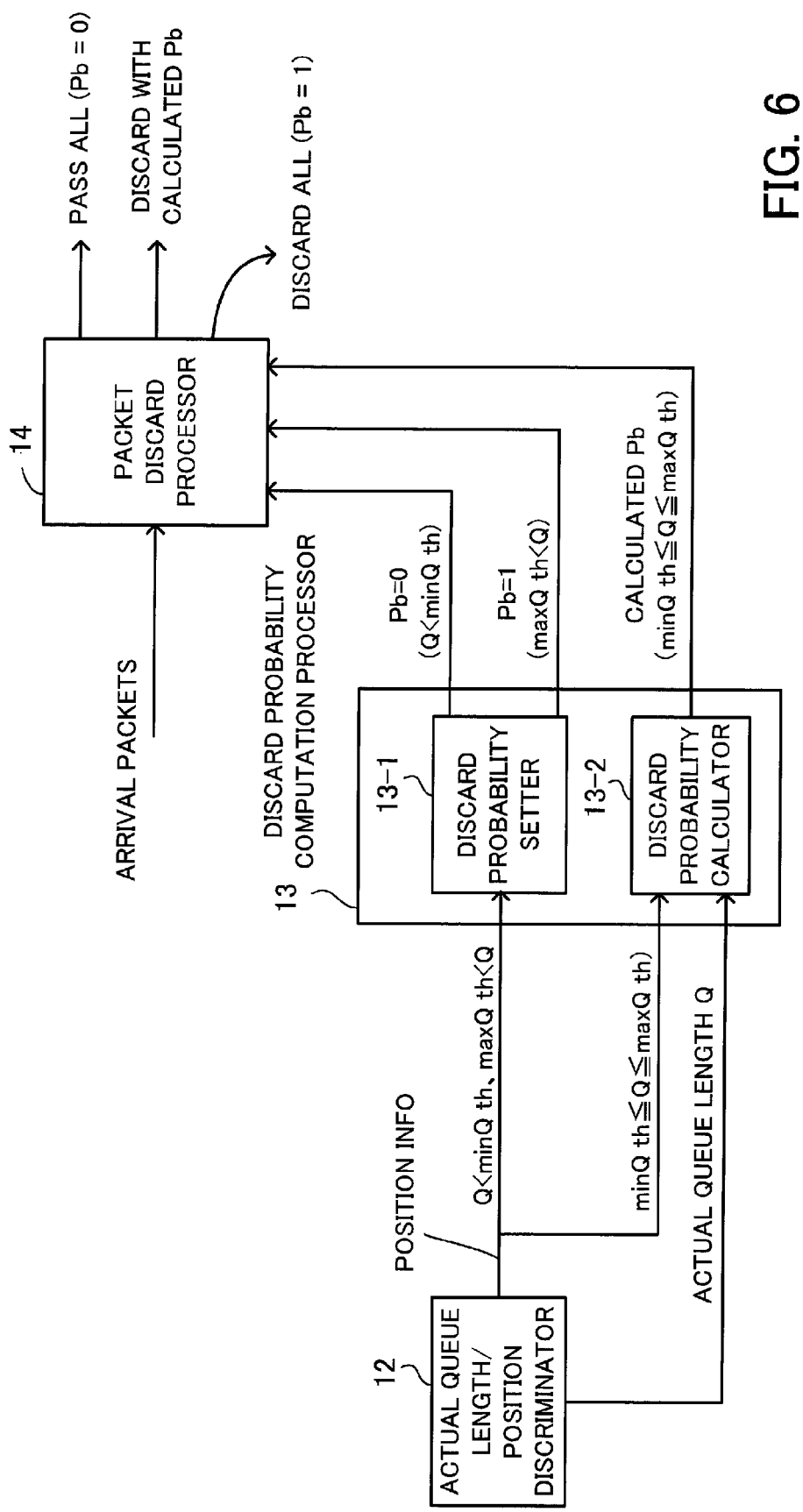
FIG. 6 illustrates the configuration of a discard probability computation processor.

If the actual queue length is not greater than the maximum threshold and is within the RED interval, the discard probability computation processor 13 calculates an average queue length, which indicates an average occupancy status of the queue 11a, then obtains a discard target as a target data amount of packets to be discarded as well as a reception target as a target data amount of packets received, and calculates the discard probability from the ratio of the discard target to the reception target (details of the operation will be described later with reference to FIG. 6 and the subsequent figures). The packets stored in the queue 11a are read out by a readout controller, not shown, and output from the corresponding output port.

Before proceeding to the detailed description of the embodiment, the basic concept of the RED process will be explained. The RED represents an algorithm for controlling a FIFO (first in first out) queue so that the queue may not be fully occupied by packets temporarily stored therein, thereby avoiding traffic congestion of the network.

In a basic RED process, the queue length (the occupancy status of the queue for storing packets) is compared with each of two thresholds (minimum and maximum thresholds), to determine whether to discard arrival packets arriving at the queue.

Packets stored in the queue are successively read out by the readout controller, and therefore, the packets once written in the queue are not discarded. Thus, the RED-based packet discarding means discarding arrival packets (packets to be input to the queue) that are not yet written in the queue.

Figure 2:
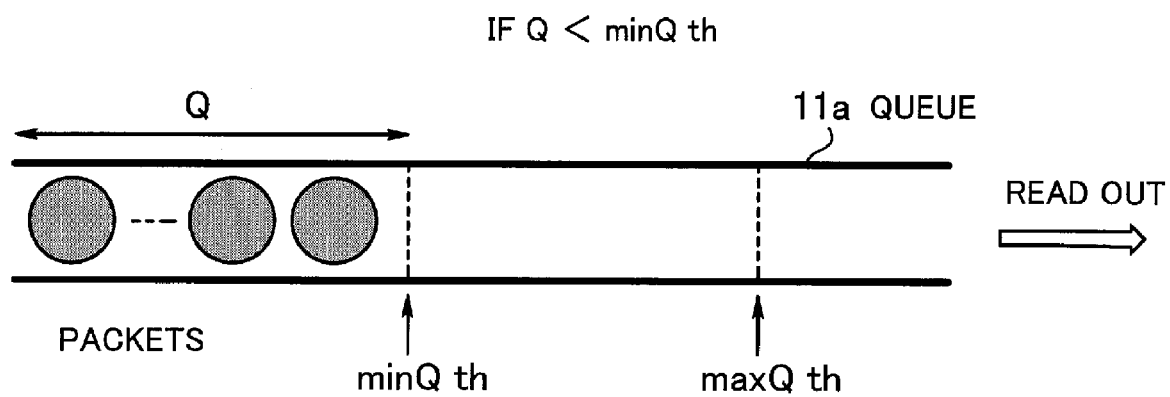
FIG. 2 is a conceptual diagram illustrating basics of a RED-based packet discarding process.
Figure 3:
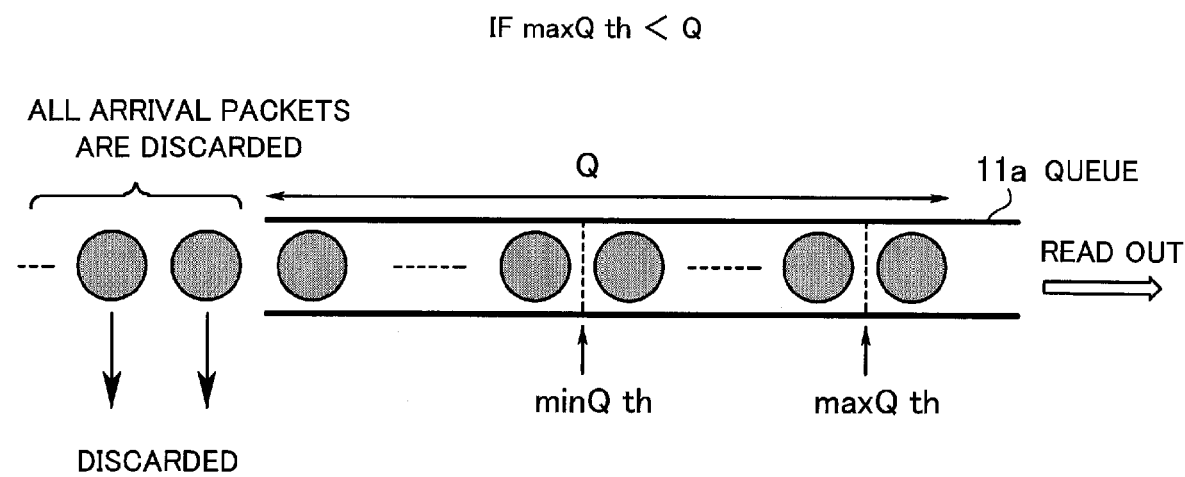
FIG. 3 is a conceptual diagram also illustrating the basics of the RED-based packet discarding process.
Figure 4:
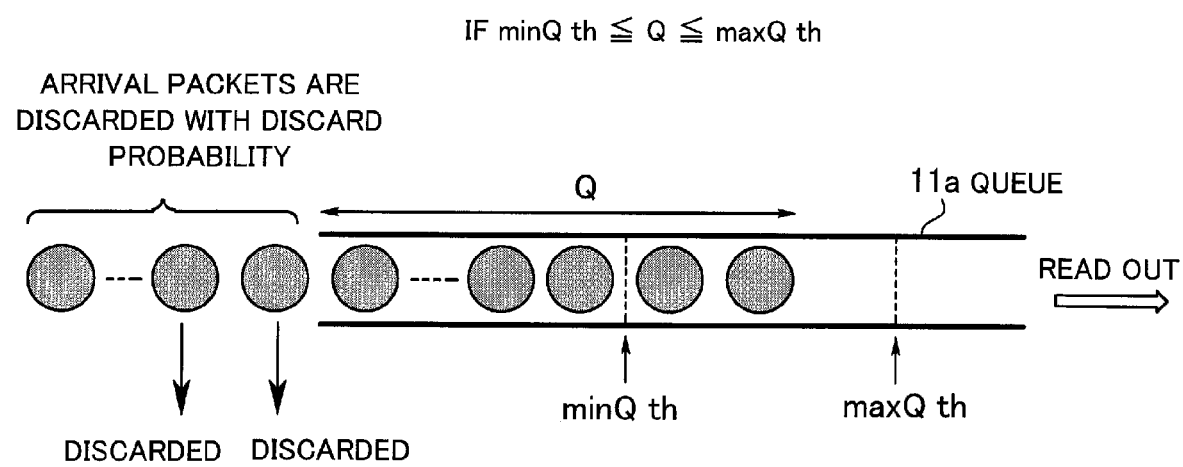
FIG. 4 is a conceptual diagram illustrating the basics of the RED-based packet discarding process.

FIGS. 2 to 4 are conceptual diagrams illustrating basics of the RED-based packet discarding process. If, with packets stored in the queue 11a, the queue length Q is less than the minimum threshold minQ th (minimum queue length value beyond which discarding of arrival packets is started), as illustrated in FIG. 2, it is judged that the queue 11a has sufficient room to store packets. Accordingly, packets are stored in the queue 11a in order of arrival, and no packets are discarded.

If the queue length Q is greater than the maximum threshold maxQ th (maximum queue length value beyond which all arrival packets are discarded), as illustrated in FIG. 3, it is judged that the queue 11a is likely to overflow. Accordingly, all packets newly arriving at the queue 11a are discarded (the values minQ th and maxQ th can be set as needed by the operator).

Discarding of all arrival packets (also referred to as tail drop) is continuously executed until the queue length becomes less than or equal to the maximum threshold maxQ th (since the packets stored in the queue 11a are successively read out by the readout controller, the queue length Q becomes less than the maximum threshold maxQ th sooner or later if no packets are input to the queue 11a).

Further, if the queue length Q is between the minimum threshold minQ th and the maximum threshold maxQ th (i.e., if the actual queue length Q is not greater than the maximum threshold maxQ th and is within the RED interval), as illustrated in FIG. 4, packets are randomly selected with a suitably set discard probability, from among the arrival packets, and the selected packets are discarded.

Figure 5:
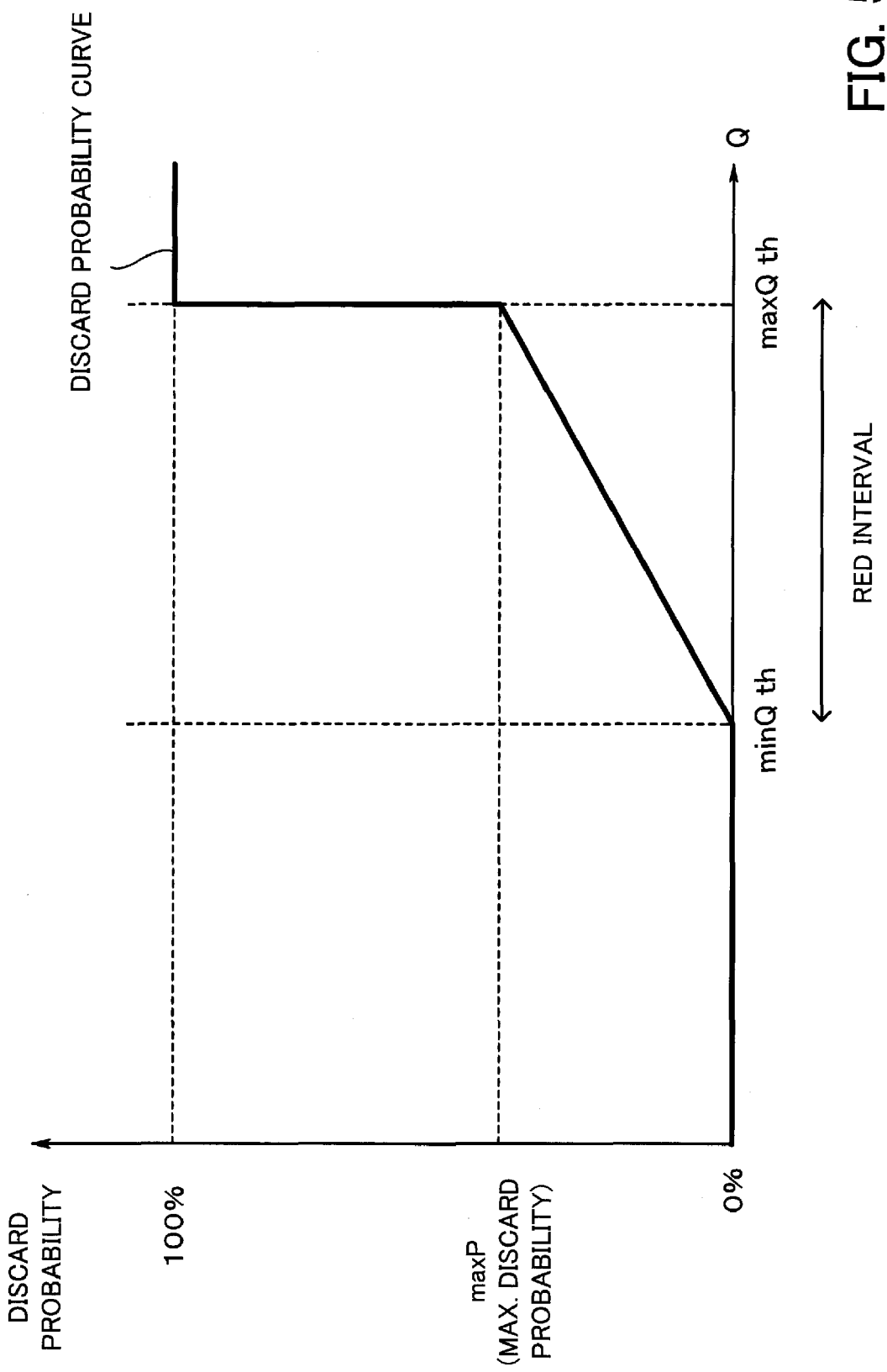
FIG. 5 illustrates an exemplary discard probability curve for RED.

FIG. 5 illustrates an exemplary discard probability curve for the RED, wherein the vertical axis indicates the discard probability (%) and the horizontal axis indicates the queue length Q. The discard probability curve represents an arrival packet discard probability dependent on the degree of elongation of the queue length Q.

When the queue length Q is less than the minimum threshold minQ th, the packet discard probability is 0% (no packets are discarded), and when the queue length Q is greater than the maximum threshold maxQ th, the arrival packet discard probability is 100% (all arrival packets are discarded).

On the other hand, when the queue length Q is between the minimum threshold minQ th and the maximum threshold maxQ th (within the RED interval), the discard probability is determined by a function with a slope indicated in FIG. 5. For example, discarding packets with a discard probability of 10% means discarding 10% of arrival packets (out of 100 arrival packets, for example, 10 packets are not written in the queue 11a (on condition that the packets have a fixed length)).

In FIG. 5, a maximum discard probability maxP is a value determining the slope of the discard probability between the minimum threshold minQ th and the maximum threshold maxQ th, and indicates up to what percent (%) of the arrival packets are to be discarded when the queue length Q is elongated to the maximum threshold maxQ th (when the queue length is beyond the maximum threshold, all arrival packets are discarded).

The configuration and operation of the packet processing apparatus 10 illustrated in FIG. 1 will be now described in detail. In the following description, it is assumed that the buffering of the queue 11a and the RED process are executed in terms of bytes.

FIG. 6 illustrates the configuration of the discard probability computation processor 13. The discard probability computation processor 13 includes a discard probability setter 13-1 and a discard probability calculator 13-2. The discard probability setter 13-1 receives the position information from the actual queue length/position discriminator 12 and, if the actual queue length is not greater than the minimum threshold, sets the discard probability to "0". If the actual queue length is greater than the maximum threshold, the discard probability is set to "1".

If it is judged from the received position information that the actual queue length is greater than the minimum threshold and at the same time less than the maximum threshold, that is, within the RED interval, the discard probability calculator 13-2 calculates an average queue length and also calculates the discard probability from the ratio of the discard target to the reception target.

The relationship between the position of the actual queue length and the discard probability Pb can be summarized as indicated by items (a) to (c) below.

(a) When the actual queue length is less than the minimum threshold (Q<minQ th), Pb=0. Namely, in this case, no packet data is discarded and all packets are allowed to pass through the packet discard processor 14 and stored in the queue 11a.

(b) When the actual queue length is greater than the minimum threshold and at the same time less than the maximum threshold (minQ th≦Q≦maxQ th), the discard probability Pb is determined by the discard probability calculator 13-2.

(c) When the actual queue length is greater than the maximum threshold (maxQ th<Q), Pb=1. Namely, in this case, all packet data is discarded by the packet discard processor 14.

In this manner, the actual queue length/position discriminator 12 determines which of the relationships Q<minQ th, minQ th≦Q≦maxQ th, and maxQ th<Q is fulfilled. Then, in accordance with the position information, the discard probability setter 13-1 notifies the packet discard processor 14 of the discard probability Pb=0 if Q<minQ th, and notifies the packet discard processor 14 of the discard probability Pb=1 if maxQ th<Q.

If the position information indicates that the relationship minQ th≦Q≦maxQ th is fulfilled, the discard probability calculator 13-2 calculates an average queue length and also calculates the discard probability from the ratio of the discard target to the reception target.

When a notification of the discard probability Pb=0 is received, the packet discard processor 14 does not discard any packets and allows arrival packets to pass therethrough, and when a notification of the discard probability Pb=1 is received, the packet discard processor 14 discards all arrival packets. On the other hand, when the discard probability Pb calculated by the discard probability calculator 13-2 is received, the packet discard processor 14 discards the arrival packets with the received discard probability.

With the RED algorithm, by transmitting packets from the transmitting side with different colors ("Green", "Yellow", and "Red") assigned to the packets, it is possible to modify the packet discarding process executed at the receiving side.

Specifically, "Green" packets are packets with the discard probability Pb=0, and thus the receiving side is prohibited from discarding the "Green" packets. "Red" and "Yellow" packets are packets that may be processed optionally at the receiving side in accordance with a discard probability in the range of 0≦Pb≦1. The "Red" packets are discarded preferentially over the "Yellow" packets.

Accordingly, in the packet processing apparatus 10, the arrival packets colored "Green" are unconditionally written in the queue 11a, while the arrival packets colored "Red" are preferentially discarded. In this case, the "Yellow" packets are the target of the RED process of the embodiment.

Figure 7:
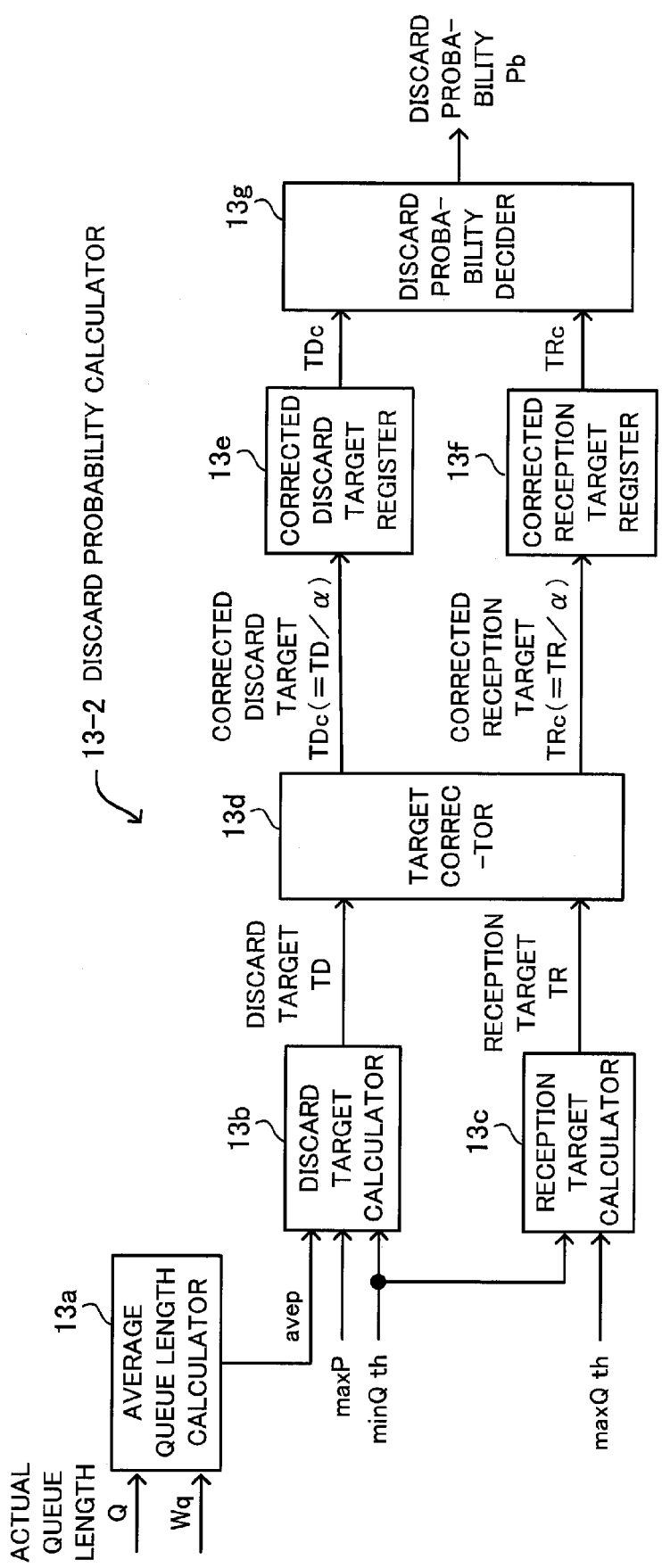
FIG. 7 illustrates the configuration of a discard probability calculator.

The configuration of the discard probability calculator 13-2 will be now described. FIG. 7 illustrates the configuration of the discard probability calculator 13-2. The discard probability calculator 13-2 includes an average queue length calculator 13a, a discard target calculator 13b, a reception target calculator 13c, a target corrector 13d, a corrected discard target register 13e, a corrected reception target register 13f, and a discard probability decider 13g.

The average queue length calculator 13a calculates an average queue length from the actual queue length Q and a weighting value Wq. Based on parameter values including the maximum discard probability maxP, the average queue length aveQ and the minimum threshold minQ th, the discard target calculator 13b calculates a discard target TD, which is a target amount of bytes to be discarded, and outputs the calculated discard target TD.

Based on parameter values including the maximum threshold maxQ th and the minimum threshold minQ th, the reception target calculator 13c calculates a reception target TR, which is a target amount of bytes received, and outputs the calculated reception target TR.

The reception target denotes the number of bytes that each output port receives at a certain sampling time (equal to the number of bytes of arrival packets arriving at the sampling time), and the discard target denotes the number of bytes to be discarded out of the number of bytes received at a certain sampling time.

The target corrector 13d divides each of the discard and reception targets TD and TR by an identical constant ($\alpha$), to generate corrected discard and reception targets TDc and TRc by reducing the respective bit values of the discard and reception targets TD and TR at an identical rate. The reason for correcting the targets will be explained later.

The corrected discard target register 13e stores the corrected discard target TDc obtained by reducing the corresponding bit value, and the corrected reception target register 13f stores the corrected reception target TRc obtained by reducing the corresponding bit value.

The discard probability decider 13g calculates the discard probability Pb by dividing the corrected discard target TDc by the corrected reception target TRc to obtain the ratio of the discard target TD to the reception target TR.

The manner of how the average queue length is calculated will be now described. The average queue length calculator 13a calculates the average queue length on the basis of the latest actual queue length (corresponding to the number of bytes currently stored in the queue 11a) acquired at the start timing of the sampling period.

Provided the actual queue length at a sampling time t(n) is Q(n), an average queue length obtained at the preceding sampling time t(n−1) is aveQ(n−1), and the weighting value is Wq, the average queue length aveQ(n) for the sampling time t(n) is calculated according to equation (1) below.

$$aveQ(n)=(1-Wq) \times aveQ(n-1)+Wq \times Q(n) \quad (1)$$

In the following, the formulas for calculating the discard target, the reception target and the discard probability will be explained. The discard target calculator 13b calculates the discard target TD according to equation (2) below.

$$TD = maxP \times (aveQ - minQ\ th) \quad (2)$$

The reception target calculator 13c calculates the reception target TR according to the following equation (3).

$$TR = maxQ\ th - minQ\ th \quad (3)$$

The target corrector 13d divides the discard target TD by the constant α to obtain the corrected discard target TDc (equation (2a)), and also divides the reception target TR by the constant α to obtain the corrected reception target TRc (equation (3a)).

$$TDc = TD/\alpha = maxP \times (aveQ - minQ\ th)/\alpha \quad (2a)$$

$$TRc = TR/\alpha = (maxQ\ th - minQ\ th)/\alpha \quad (3a)$$

The discard probability decider 13g calculates the discard probability Pb according to the following equation (4) (since maxP is expressed in %, the denominator is multiplied by "100"):

$$Pb = \{maxP \times (aveQ - minQ\ th)/\alpha\}/\{((maxQ\ th - minQ\ th)/\alpha) \times 100\} \quad (4)$$

As described above, in the packet processing apparatus 10, the amount of data stored in the queue 11a is periodically read out, and the reception target, which is a target number of bytes of packets received, and the discard target, which is a target number of bytes of packets to be discarded, are obtained every sampling period to calculate the discard probability.

Since the control is executed on the basis of the sampling period, the numbers of bits handled by counters and the like can be clearly defined, making it possible to implement the control by means of hardware (logic circuitry) and also to increase the processing speed. Further, since the discard probability is calculated and updated every sampling period to perform the packet discarding process, the discard probability can be made to follow up the original linear discard probability curve.

Figure 8:
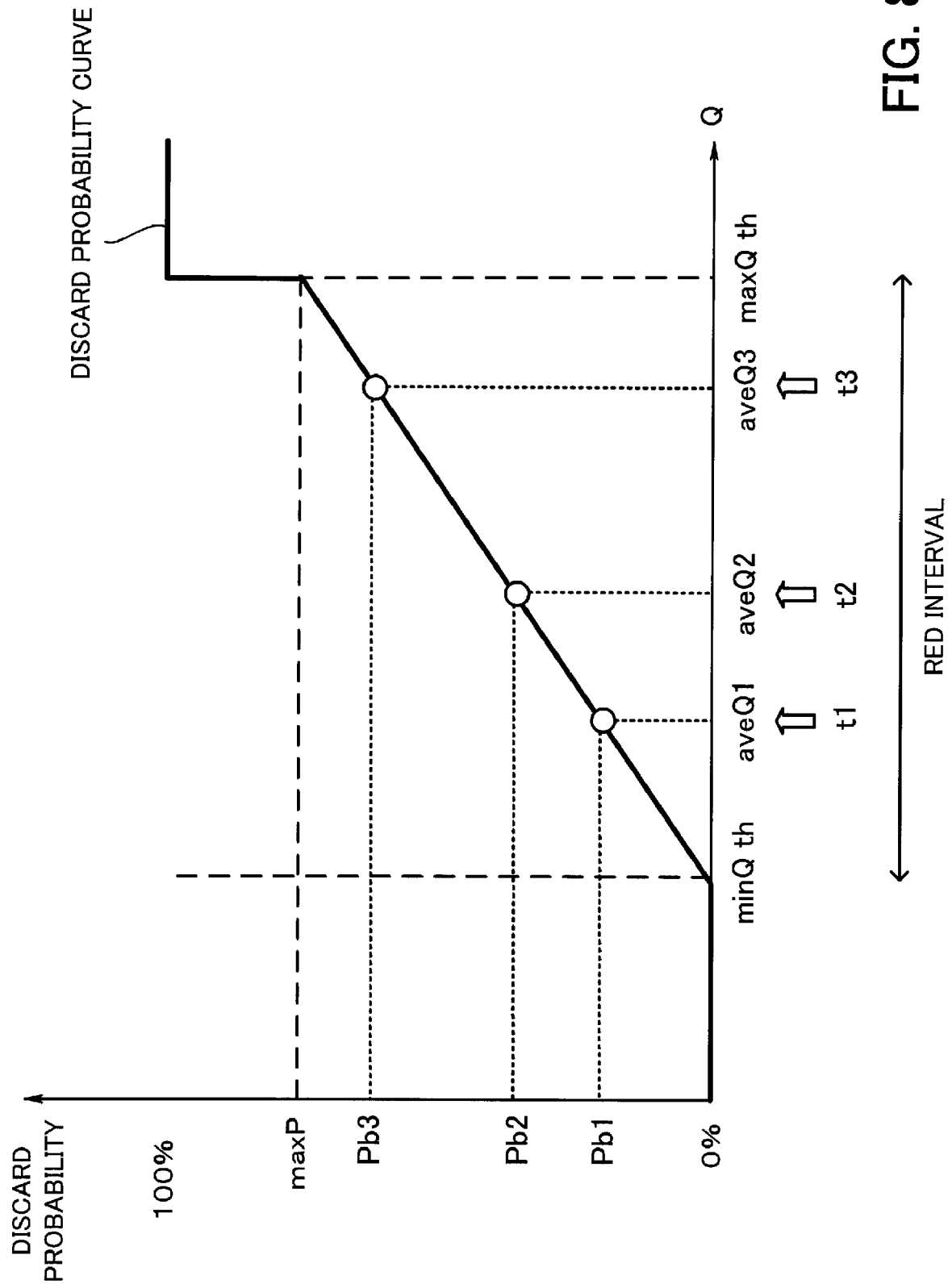
FIG. 8 illustrates the manner of how the discard probability curve is followed up.

FIG. 8 illustrates the manner of how the discard probability curve is followed up. At a sampling time t1 in the RED interval, an average queue length aveQ1 is obtained and a discard probability Pb1 for this sampling period is calculated. Similarly, at a sampling time t2, a discard probability Pb2 for an average queue length aveQ2 is calculated, and at a sampling period t3, a discard probability Pb3 for an average queue length aveQ3 is calculated.

In the aforementioned conventional technique, a stepwise discard probability curve is generated, and packets are discarded in accordance with the approximated discard probability curve. In the packet processing apparatus 10, on the other hand, during the RED interval, the latest actual queue length is acquired every sampling period to obtain the average queue length, and the discard probability is calculated from the parameters (maximum discard probability, minimum and maximum thresholds, average queue length, etc.). Accordingly, packets are discarded with the discard probability derived every sampling period, and since this means that the original linear discard probability curve is followed up, the discarding error of the RED process can be reduced, making it possible to improve the accuracy of the RED process.

The target corrector 13d will be now described. In the target corrector 13d, the calculated discard and reception targets are individually divided by the same constant α, to generate corrected discard and reception targets by reducing the respective bit values of the discard and reception targets at the same rate. The reason for performing the correction is as follows:

To configure the packet processing apparatus 10 so as to be able to perform the RED process by means of hardware only, it is necessary that the discard and reception targets calculated by the discard and reception target calculators 13b and 13c, respectively, be temporarily held in memories (registers) at every sampling period.

What is to be finally obtained by the discard probability calculator 13-2 is the discard probability, and the discard probability is obtained as the ratio of the discard target to the reception target (discard target÷reception target). Thus, to obtain the ratio, actually calculated values of the discard and reception targets need not necessarily be used, and the discard and reception targets (numerator and denominator) to be used may be values obtained by reducing the respective bit values at an identical rate.

Accordingly, the values calculated by the discard and reception target calculators 13b and 13c need not be held intact in the registers. Instead, the values (corrected discard and reception targets) obtained by reducing the discard and reception targets at the same rate may be generated and held in the registers, in which case the capacities of the registers can be decreased.

In the target corrector 13d, therefore, the corrected discard and reception targets are generated by reducing the discard and reception targets at the identical rate, and for the registers, registers (corrected discard and reception target registers 13e and 13f) each with a number of bits smaller than that of the actually calculated values of the discard and reception targets are used. This makes it possible to reduce the capacities of the registers, thereby decreasing the size of the circuitry of the whole apparatus.

Figure 9:
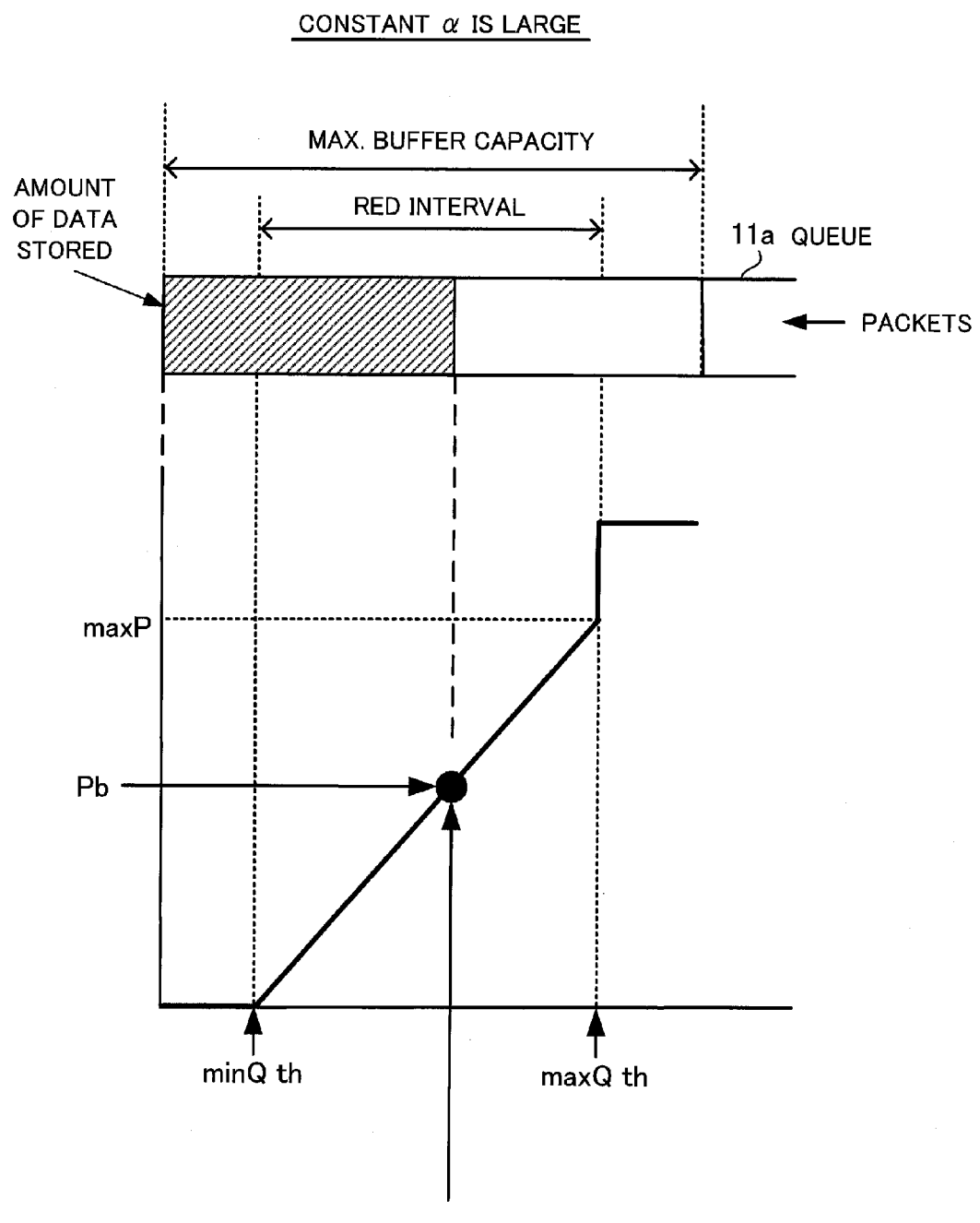
FIG. 9 illustrates the relationship between the magnitude of a constant and the length of a RED interval.

The following describes the manner of how the constant α is determined. FIGS. 9 and 10 each illustrate the relationship between the magnitude of the constant α and the length of the RED interval. As illustrated, the value of the constant α is so set as to be variable in proportion to the length of the RED interval.

Specifically, as seen from FIG. 9, the longer the RED interval, namely, the longer the interval between the minimum threshold minQ th and the maximum threshold maxQ th, the larger value the constant α is set to. Also, as seen from FIG. 10, the shorter the RED interval, the smaller value the constant α is set to (in both of FIGS. 9 and 10, the position of the actual queue length is illustrated so as to coincide with the position of the average queue length for ease of understanding).

In this manner, the target corrector 13d sets the magnitude of the constant α in proportion to the length of the RED interval so that the rate of the reduction by means of the constant α may assume a fixed value regardless of whether the length of the RED interval is long or short.

FIG. 11 illustrates an example of how the constant α is set. Where the maximum capacity of the queue 11a is $2^{24}$ ($A^{\wedge}B = A^B$) and the maximum threshold maxQ th can also be set up to $2^{24}$, the constant α is set in the manner illustrated in FIG. 11.

Let us consider the bit capacity of the corrected discard target. The maximum number of bytes of (aveQ−minQ th)/α is given by 2^24/2^16=2^8 because aveQ≈maxQ th, and therefore, is 256 bytes. Also, provided maxP=50, the corrected discard target is 50×256=12,800 because the corrected discard target is given by maxP×(aveQ−minQ th)/α. Accordingly, the number of bits necessary for the corrected discard target register 13e is 14 bits (2^14=16,384).

As for the bit capacity of the corrected reception target, the maximum number of bytes of (maxQ th−minQ th) is 256 bytes, as in the case of the corrected discard target, and therefore, (maxQ th−minQ th)/α×100 equals 256×100=25,600. Accordingly, the number of bits necessary for the corrected reception target register 13f is 15 bits (2^15=32,768).

The following describes a specific configuration of an apparatus implementing the function of the packet processing apparatus 10. FIG. 12 illustrates the configuration of a packet processing apparatus. The packet processing apparatus 20 comprises a packet buffer 21, a packet receiver 22, a sampling counter 23, a setting data holder 24, a computation result holding table manager 25, and a packet discard computation processor 26.

The packet buffer 21 corresponds to the packet buffer 11 illustrated in FIG. 1. The packet buffer 21 has queue sections 21-1 to 21-n associated with respective output ports #1 to #N and each including queues q1 to qm (each output port is associated with multiple queues).

The packet receiver 22, which has the function of the packet discard processor 14 illustrated in FIG. 1, receives an arrival packet from the preceding stage and shifts and thereby holds the packet data (in the existing circuit configuration, the packet data is shifted seven stages) until a discard notification is received (until the computation for the discarding process is completed). The packet is discarded in accordance with the received discard notification. Also, when an arrival packet is received, the packet receiver 22 identifies the output port number, length value, class, etc. from the packet header or label, and outputs the identified information as packet status information.

The sampling counter 23 corresponds to the sampling period generator 16 illustrated in FIG. 1 and counts the sampling period. For example, the sampling counter 23 generates a sampling signal with a period ranging from 80 µs to 20.4 ms in 80 µs steps.

The setting data holder (setting register) 24 corresponds to the setting data holder 15 illustrated in FIG. 1 and stores various parameter data (maxP, minQ th, maxQ th, etc.) set from outside (external CPU).

The computation result holding table manager 25 stores and manages the results of the packet discarding process-related computations (RED computations) performed by the packet discard computation processor 26, flag information and the like. The computation result holding table manager 25 functions as the corrected discard target register 13e and the corrected reception target register 13f illustrated in FIG. 7.

The packet discard computation processor 26, which functions as the actual queue length/position discriminator 12 and the discard probability computation processor 13 illustrated in FIG. 1, acquires parameters necessary for the RED computation from the setting data holder 24, as well as the information on packets to be processed from the computation result holding table manager 25, and performs the packet discard computation. Also, the packet discard computation processor 26 writes back (WB) the computation results into the computation result holding table manager 25 and generates a discard notification to be sent to the packet receiver 22.

Further, at every sampling period, the packet discard computation processor 26 reads out data held by the setting data holder 24 and updates the settings of the computation result holding table manager 25. The setting data holder 24 is looked up every sampling period because minQ th, maxQ th or maxP may have been varied at the preceding sampling time due to the occurrence of a dynamic change during in-service operation.

The packet processing apparatus 20 carries out the packet discarding process in one of two modes, namely, individual mode and overall mode. In the individual mode, the actual queue length is acquired from one of the multiples queues (queues q1 to qm), and the packet discarding process is performed on the basis of the single actual queue length acquired from the single queue.

In the overall mode, on the other hand, all of the queue lengths of the multiple queues (queues q1 to qm) are added together to obtain a sum as the actual queue length, and based on the actual queue length sum of the actual queue lengths acquired from the multiple queues, the packet discarding process is executed.

Thus, in the individual mode, provided the single queue length at the sampling time t(n) is Qa(n), the average queue length at the preceding sampling time t(n−1) is aveQa(n−1), and the weighting value is Wq, the average queue length aveQa(n) for the sampling time t(n) is calculated as indicated by the following equation (5a):

$$aveQa(n) = (1-Wq) \times aveQa(n-1) + Wq \times Qa(n) \quad (5a)$$

In the overall mode, provided the actual queue length sum at the sampling time t(n) is Qb(n), the average queue length at the preceding sampling time t(n−1) is aveQb(n−1), and the weighting value is Wq, the average queue length aveQb(n) for the sampling time t(n) is calculated as indicated by equation (5b) below.

$$aveQb(n) = (1-Wq) \times aveQb(n-1) + Wq \times Qb(n) \quad (5b)$$

The packet discarding process is executed basically in the same manner regardless of whether the single actual queue length or the actual queue length sum is used, and therefore, no particular distinction is made in the following explanation.

Table information managed by the computation result holding table manager 25 will be now described. FIG. 13 illustrates an exemplary arrangement of a computation result holding table. The computation result holding table 25a is constituted by a RAM (Random Access Memory) and holds the computation results, flag information and the like. The computation result holding table 25a is provided for each of networks (WAN, LAN, etc.) to which the packet processing apparatus 20 is connected. In the following, individual items registered in the table will be explained.

"Add" indicates the identification number assigned to an output port (the identification number represents an address in the RAM). "PTY" denotes a parity bit, and one parity bit is allocated to the sequence from "RED on/off" to "Corrected reception target" and another to the sequence "Discard count"+"Reception count". In case of PTY error, an alarm notification is merely sent, and basically, the packets are not discarded and are handled in accordance with the instructions from the host.

For "RED on/off", "1" (ON) is set when the RED process is executed, and "0" (OFF) is set when the RED process is not executed ("1" or "0" is set for each sampling period). "Pass all" is a bit indicating, with respect to each sampling period, whether or not the latest actual queue length is greater than the minimum threshold minQ th. If the minimum threshold is exceeded, "1" ("Pass all") is set, and if not, "0" is set.

"Discard all" is a bit indicating, with respect to each sampling period, whether or not the latest actual queue length is greater than maxQ th. If maxQ th is exceeded, "1" ("Discard all") is set, and if not, "0" is set. As for "Average queue length", the average queue length is written every sampling period.

For "Discard flag", "1" (ON) is set when the value of a reception count is greater than the reception target, and "0" (OFF) is set when the value of a discard count is greater than the discard target. For "Corrected discard target" and "Corrected reception target", the corrected discard and reception targets calculated every sampling period are written, respectively. "Discard count" indicates the number of bytes of actually discarded packets, and "Reception count" indicates the number of bytes of actually received packets.

Referring now to a flowchart, the operation of the packet processing apparatus 20 will be described. FIG. 14 is a flowchart illustrating the whole operation of the packet discard computation processor 26, inclusive of the position discrimination and the computation. Specifically, the flowchart illustrates the process flow including discrimination of the position of the actual queue length, calculation of the corrected discard and reception targets etc., and writing of the computation results in the computation result holding table 25a.

S0: The process starts when the sampling signal is received.

S1: The packet discard computation processor 26 determines whether the RED processing mode is the individual mode (mode in which the actual queue length is acquired from one of the queues q1 to qm and the packet discarding process is executed on the basis of the acquired queue length) or the overall mode (mode in which the queue lengths of all queues q1 to qm are added together and the packet discarding process is executed on the basis of the obtained sum as the actual queue length).

S2: The packet discard computation processor 26 finds the positional relationship of the actual queue length relative to the RED interval (the actual queue length used differs depending on whether the selected mode is the individual mode or the overall mode).

S3: It is determined whether to execute the RED algorithm processing or not. If the algorithm processing is not executed, the flow proceeds to Step S4; if the algorithm processing is to be executed, the flow proceeds to Step S5.

S4: RED on/off=0, Pass all=0, and Discard all=1 or 0 (dependent on the position of the actual queue length) are set in the respective fields of the computation result holding table 25a associated with the corresponding output port. Also, the discard flag, the corrected discard and reception targets, the discard and reception counts and the average queue length are cleared.

S5: It is determined whether or not the actual queue length is less than the maximum threshold and is within the RED interval. If the actual queue length is outside the RED interval, the flow proceeds to Step S6; if the actual queue length is within the RED interval, the flow proceeds to Step S7.

S6: RED on/off=1, Pass all=0 or 1, and Discard all=1 or 0 (dependent on the position of the actual queue length) are set in the respective fields of the computation result holding table 25a associated with the corresponding output port. Also, the discard flag, the corrected discard and reception targets, the discard and reception counts and the average queue length are cleared.

Specifically, the bits are set as follows. When Q<minQ th, ("Pass all" bit, "Discard all" bit)=(1, 0), when maxQ th<Q, ("Pass all" bit, "Discard all" bit)=(0, 1), and when minQ th≦Q≦maxQ th, ("Pass all" bit, "Discard all" bit)=(0, 0).

S7: The average queue length, the corrected discard and reception targets and the discard probability are calculated.

S8: RED on/off=1, Pass all=0, and Discard all=0 are set in the respective fields of the computation result holding table 25a associated with the corresponding output port. The discard flag and the discard and reception counts are left unchanged. With respect to the corrected discard and reception targets and the average queue length, the calculated values are written over the stored values.

FIG. 15 is a flowchart illustrating a process executed when a packet arrives. Specifically, the flowchart illustrates the process flow including acceptance of arrival packets and discarding or passing of the packets in accordance with the computation results and flag values written in the computation result holding table 25a.

S11: The packet receiver 22 extracts the output port number, length value, class information, color information, etc. from the header or label of an arrival packet, and outputs the extracted information as the packet status information.

S12: The packet discard computation processor 26 identifies the class of the packet, and executes Step S13 if the class is A or B, or executes Step S14 if the class is C or D. The class represents the readout priority of packets stored in the queues. Classes A and B indicate high-priority packets that are not to be discarded by the RED process, and Classes C and D indicate low-priority packets that may be discarded as needed by the RED process.

S13: The packet discard computation processor 26 sends "Pass all" as the discard notification, and the packet receiver 22 passes the arrival packet therethrough to be sent to the corresponding output port.

S14: Using the output port number as an address, the packet discard computation processor 26 reads out the corresponding information (RED on/off, Pass all, Discard all, Discard flag, Discard count, Reception count, Corrected discard target, Corrected reception target, Average queue length) from the computation result holding table 25a.

S15: The packet discard computation processor determines whether to execute the RED algorithm processing or not. If the RED algorithm processing is not executed, the flow proceeds to Step S16; if the RED algorithm processing is to be executed, the flow proceeds to Step S19.

S16: The packet discard computation processor 26 determines whether or not "Discard all"=1 is fulfilled. If "Discard all" is not "1", the flow proceeds to Step S13; if "Discard all" is equal to "1", the flow proceeds to Step S17.

S17: The packet discard computation processor 26 determines whether or not the color assigned to the packet is "Yellow". If the packet color is not "Yellow" (if the color is "Green"), the flow proceeds to Step S13; if the color is "Yellow", the flow proceeds to Step S18.

S18: The packet discard computation processor sends "Discard all" as the discard notification, and the packet receiver 22 discards the arrival packet.

S19: On recognizing ("Pass all" bit, "Discard all" bit)=(0, 0), the packet discard computation processor 26 executes discard flag control (flowchart of FIG. 16). If ("Pass all" bit, "Discard all" bit)=(1, 0), the flow proceeds to Step S13, and if ("Pass all" bit, "Discard all" bit)=(0, 1), the flow proceeds to Step S18. The situation where ("Pass all" bit, "Discard all" bit)=(1, 1) is unlikely to occur, but if such an erroneous combination of values is set in the table, the arrival packet is discarded.

FIG. 16 is a flowchart illustrating an operation of the discard flag control.

S21: The packet discard computation processor determines whether or not the color assigned to the packet is "Yellow". If the packet color is not "Yellow" (if the color is "Green"), the flow proceeds to Step S22; if the packet color is "Yellow", the flow proceeds to Step S24.

S22: The packet discard computation processor 26 sends "Pass all" as the discard notification, and the packet receiver 22 passes the arrival packet therethrough to be sent to the corresponding output port.

S23: The packet discard computation processor 26 executes first discard flag control (details will be explained later). Also, the values of the discard count, reception count and discard flag obtained by the first discard flag control are written in the corresponding fields of the computation result holding table 25a associated with the target network (WAN, LAN, etc.).

S24: The packet discard computation processor determines whether or not "Discard all"=1 is fulfilled. If "Discard all" is not equal to "1", the flow proceeds to Step S22; if "Discard all" is "1", the flow proceeds to Step S25.

S25: The packet discard computation processor sends "Discard all" as the discard notification, and the packet receiver 22 discards the arrival packet.

S26: The packet discard computation processor 26 executes second discard flag control (details will be explained later). Also, the values of the discard count, reception count and discard flag obtained by the second discard flag control are written in the corresponding fields of the computation result holding table 25a associated with the target network.

The discard flag control will be now described. The discard flag (1 bit) is a flag which is so set that when the discard flag is ON, the received packet is discarded. Basically, the flag is set ON and OFF in the following manner: If the reception count value becomes greater than the reception target, the discard flag is set ON, and if the discard count value becomes greater than the discard target, the discard flag is set OFF. The count values and the flag value are, however, obtained under conditions (1) and (2) stated below, and the obtained values are written back to the computation result holding table 25a.

(1) Write-back control (first discard flag control) executed when the discard flag read out from the computation result holding table 25a is OFF.

The previous discard count is set as the new discard count (new discard count=discard count), and the length value+the previous reception count is set as the new reception count (new reception count=length value+reception count).

If, in this case, both of the relationships:

reception count+length value≧corrected reception target; and discard count≧corrected discard target are fulfilled, the value of the corrected reception target is subtracted from the reception count, but the discard flag is not set ON, and the value of the corrected discard target is subtracted from the discard count.

Accordingly, the packet discard computation processor 26 writes back the value:

new discard count−corrected discard target as the discard count (write-back discard count) to the computation result holding table 25a, writes back the value:

new reception count−corrected reception target as the reception count (write-back reception count) to the computation result holding table 25a, and writes back "0" as the discard flag (write-back discard flag) to the computation result holding table 25a.

If the relationship:

discard count<corrected discard target is fulfilled, the value of the corrected reception target is subtracted from the reception count, and the discard flag is set ON to allow the next arrival packet to be discarded. Consequently, the information (write-back discard count, write-back reception count, write-back discard flag) written back to the computation result holding table 25a is:

write-back discard count=new discard count;

write-back reception count=new reception count−corrected reception target; and write-back discard flag=1.

Further, if the relationship:

reception count+length value<corrected reception target is fulfilled, the discard flag is not set ON, and the discard count is left unchanged. Thus, the information (write-back discard count, write-back reception count, write-back discard flag) written back to the computation result holding table 25a is:

write-back discard count=new discard count;

write-back reception count=new reception count; and write-back discard flag=0.

(2) Write-back control (second discard flag control) executed when the discard flag read out from the computation result holding table 25a is ON.

For the new discard count, the length value+the previous discard count is set (new discard count=length value+discard count), and for the new reception count, the length value+the previous reception count is set (new reception count=length value+reception count).

In this case, if both of the relationships:

discard count+length value≧corrected discard target; and reception count≧corrected reception target are fulfilled, the value of the corrected discard target is subtracted from the discard count, the discard flag is cleared, and the value of the corrected reception target is subtracted from the reception count. Accordingly, the information (write-back discard count, write-back reception count, write-back discard flag) written back to the computation result holding table 25a is:

write-back discard count=new discard count−corrected discard target;

write-back reception count=new reception count−corrected reception target; and write-back discard flag=0.

If the relationship:

reception count<corrected reception target is fulfilled, the value of the corrected discard target is subtracted from the discard count, and the discard flag is cleared. Consequently, the information (write-back discard count, write-back reception count, write-back discard flag) written back to the computation result holding table 25a is:

write-back discard count=new discard count−corrected discard target;

write-back reception count=new reception count; and write-back discard flag=0.

Also, if both of the relationships:

discard count+length value<corrected discard target; and reception count+length value≧corrected reception target are fulfilled, the value of the corrected discard target is not subtracted from the discard count, and the discard flag is left in the ON state. Thus, the information (write-back discard count, write-back reception count, write-back discard flag) written back to the computation result holding table 25a is:

write-back discard count=new discard count;

write-back reception count=new reception count; and write-back discard flag=1.

Further, if the relationship:

reception count+length value<corrected reception target is fulfilled, the value of the corrected discard target is not subtracted from the discard count, and the discard flag is left in the ON state. Accordingly, the information (write-back discard count, write-back reception count, write-back discard flag) written back to the computation result holding table 25a is:

write-back discard count=new discard count;

write-back reception count=new reception count; and write-back discard flag=1.

As described above, the packet processing apparatus 10, 20 has a hardware configuration by which the amount of data stored in the packet buffer queue is periodically read out, the target number of bytes of packets received and the target number of bytes of packets to be discarded are calculated within the period, and whether to discard or pass the received packets is determined in accordance with the target numbers. Consequently, the packet discarding process can be executed at high speed. Also, the discard probability is calculated and updated every sampling period to perform the packet discarding process. Accordingly, the original linear discard probability curve can be followed up, and since the discarding error is reduced, the packet discarding process can be executed with high accuracy.

In the packet processing apparatus of the present invention, the average queue length is calculated every sampling period. If the average queue length is within the random early detection interval, the discard target and the reception target are obtained by updating the respective targets at every sampling period, and the discard probability is calculated from the ratio of the discard target to the reception target, to perform the discarding process on arrival packets in every sampling period. Since the packet discarding process is implemented by hardware only, the process can be executed at high speed. Also, since the discard probability is calculated and updated every sampling period to perform the packet discarding process, the original linear discard probability curve can be followed up and thus the discarding error can be reduced, enabling high-accuracy packet discarding process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A packet processing apparatus for performing a packet discarding process, comprising:
    a packet buffer provided with a queue for storing packets;
    an actual queue length/position discriminator configured to acquire, at every sampling period, an actual queue length indicating an occupancy status of the queue storing packets, determine a positional relationship of the actual queue length relative to a random early detection interval indicative of a range between a minimum threshold, which is a minimum queue length value beyond which packet discarding is started, and a maximum threshold, which is a maximum queue length value beyond which all packets are discarded, and output the determined positional relationship as position information;
    a discard probability computation processor configured to calculate, at every sampling period, a packet discard probability based on the position information; and
    a packet discard processor configured to discard, at every sampling period and in accordance with the discard probability, packets that are not yet stored in the queue,
    wherein, if the actual queue length is not greater than the maximum threshold and is within the random early detection interval, the discard probability computation processor calculates an average queue length, which indicates an average occupancy status of the queue, then obtains a discard target as a target data amount of packets to be discarded and a reception target as a target data amount of packets received at a sampling time, and calculates the discard probability from a ratio of the discard target to the reception target,
    wherein the a discard probability computation processor includes:
    an average queue length calculator configured to calculate the average queue length;
    a discard target calculator configured to calculate the discard target;
    a reception target calculator configured to calculate the reception target;
    a target corrector configured to divide each of the calculated discard and reception targets by an identical constant, to generate corrected discard and reception targets by reducing respective bit values of the discard and reception targets at an identical rate;
    a corrected discard target register configured to store the corrected discard target obtained by reducing the bit value of the discard target;
    a corrected reception target register configured to store the corrected reception target obtained by reducing the bit value of the reception target; and
    a discard probability decider configured to calculate the discard probability by dividing the corrected discard target by the corrected reception target to obtain the ratio of the discard target to the reception target.

2. The packet processing apparatus according to claim 1, wherein the discard probability computation processor sets the discard probability to "0" if it is judged from the position information that the actual queue length is less than the minimum threshold, and set the discard probability to "1" if it is judged that the actual queue length is greater than the maximum threshold
and calculates the average queue length and calculates the discard probability from the ratio of the discard target to the reception target if it is judged from the position information that the actual queue length is greater than the minimum threshold and less than the maximum threshold and thus within the random early detection interval.

3. The packet processing apparatus according to claim 1, wherein, provided the actual queue length at a sampling time t(n) is Q(n), the average queue length at a preceding sampling time t(n−1) is aveQ(n−1), and a weighting value is Wq, the average queue length calculator calculates the average queue length aveQ(n) for the sampling time t(n) according to an equation:

$$aveQ(n)=(1-Wq)\times aveQ(n-1)+Wq\times Q(n).$$

4. The packet processing apparatus according to claim 1, wherein, provided the average queue length is aveQ, a maximum discard probability within the random early detection interval is maxP, the minimum threshold is minQ th, the maximum threshold is maxQ th, and the constant is α,
the discard target calculator obtains the discard target as: maxP×(aveQ−minQ th),
the reception target calculator obtains the reception target as:
(maxQ th−minQ th),
the target corrector obtains the corrected discard target as: maxP×(aveQ−minQ th)/α,
as well as the corrected reception target as:
(maxQ th−minQ th)/α, and
the discard probability computation processor calculates the discard probability Pb according to an equation:

$$Pb=\{maxP\times(aveQ-minQ\ th)/\alpha\}/\{((maxQ\ th-minQ\ th)/\alpha)\times 100\}.$$

5. The packet processing apparatus according to claim 1, wherein the target corrector sets a magnitude of the constant in proportion to a length of the random early detection interval so that the rate of the reduction by means of the constant may assume a fixed value regardless of whether the length of the random early detection interval is long or short.

6. A packet processing apparatus for performing a packet discarding process, comprising:
a packet buffer provided with a plurality of queues for storing packets directed to each of output ports;
a packet discard computation processor configured to acquire, at every sampling period, a latest actual queue length indicating an occupancy status of the queues storing packets, determine a positional relationship of the actual queue length relative to a random early detection interval indicative of a range between a minimum threshold, which is a minimum queue length value beyond which packet discarding is started, and a maximum threshold, which is a maximum queue length value beyond which all packets are discarded, to generate position information, and calculate, at every sampling period, a packet discard probability based on the position information; and
a packet receiver configured to receive arrival packets and discard, at every sampling period and in accordance with the discard probability, packets that are not yet stored in the queues, wherein, in an individual mode, the packet discard computation processor acquires the actual queue length from one of the multiple queues, and if a single actual queue length, which is the actual queue length acquired from the one queue, is not greater than the maximum threshold and is within the random early detection interval, the packet discard computation processor calculates an average queue length, which indicates an average occupancy status of the queue, based on the single actual queue length, then obtains a discard target as a target data amount of packets to be discarded and a reception target as a target data amount of packets received, and calculates the discard probability from a ratio of the discard target to the reception target, and in an overall mode, the packet discard computation processor adds up the actual queue lengths of all of the multiple queues associated with each of the output ports to acquire a sum as the actual queue length, and if an actual queue length sum, which is the sum of the actual queue lengths acquired from the multiple queues, is not greater than the maximum threshold and is within the random early detection interval, the packet discard computation processor calculates an average queue length, which indicates an average occupancy status of the queues, based on the actual queue length sum, then obtains a discard target as a target data amount of packets to be discarded and a reception target as a target data amount of packets received, and calculates the discard probability from a ratio of the discard target to the reception target, wherein:
in the individual mode, the packet discard computation processor calculates the average queue length aveQa(n) for a sampling time t(n) according to an equation:

$$aveQa(n)=(1-Wq)\times aveQa(n-1)+Wq\times Qa(n),$$

where Qa(n) is the single actual queue length at the sampling time t(n), aveQa(n−1) is the average queue length at a preceding sampling time t(n−1), and Wq is a weighting value, and in the overall mode, the packet discard computation processor calculates the average queue length aveQb(n) for a sampling time t(n) according to an equation:

$$aveQb(n)=(1-Wq)\times aveQb(n-1)+Wq\times Qb(n),$$

where Qb(n) is the actual queue length sum at the sampling time t(n), aveQb(n−1) is the average queue length at a preceding sampling time t(n−1), and Wq is a weighting value.

7. The packet processing apparatus according to claim 6, wherein the packet discard computation processor sets the discard probability to "0" if it is judged from the position information that the single actual queue length or the actual queue length sum is less than the minimum threshold, and sets the discard probability to "1" if it is judged that the single actual queue length or the actual queue length sum is greater than the maximum threshold, and
if it is judged from the position information that the single actual queue length or the actual queue length sum is greater than the minimum threshold and less than the maximum threshold and thus within the random early detection interval, the packet discard computation processor calculates the average queue length from the single actual queue length or the actual queue length sum, and calculates the discard probability from the ratio of the discard target to the reception target.

8. The packet processing apparatus according to claim 6, wherein, provided the average queue length is aveQ, a maximum discard probability within the random early detection interval is maxP, the minimum threshold is minQ th, and the maximum threshold is maxQ th, the packet discard computation processor obtains the discard target as:

maxP×(aveQ−minQ th), as well as the reception target as:

(maxQ th−minQ th), and provided a constant is $\alpha$, the packet discard computation processor divides each of the calculated discard and reception targets by the constant $\alpha$, to generate corrected discard and reception targets as:

maxP×(aveQ−minQ th)/$\alpha$, and (maxQ th−minQ th)/$\alpha$, respectively, by reducing respective bit values of the discard and reception targets at an identical rate, and calculates the discard probability Pb according to an equation:

$Pb=\{maxP \times (aveQ-minQ\ th)/\alpha\}/\{((maxQ\ th-minQ\ th)/\alpha) \times 100\}$.

9. The packet processing apparatus according to claim 8, wherein the packet discard computation processor sets a magnitude of the constant in proportion to a length of the random early detection interval so that the rate of the reduction by means of the constant may assume a fixed value regardless of whether the length of the random early detection interval is long or short.

10. The packet processing apparatus according to claim 6, further comprising a computation result holding table manager configured to manage a computation result holding table in which is set at least one of a "pass all" bit indicating, with respect to each sampling period, whether or not the minimum threshold is exceeded by a latest actual queue length, a "discard all" bit indicating, with respect to each sampling period, whether or not the maximum threshold is exceeded by the latest actual queue length, the average queue length, the corrected discard target, the corrected reception target, a reception count indicating a number of bytes of packets received, a discard count indicating a number of bytes of packets discarded, and a discard flag which is set ON when the reception target is exceeded by the reception count and which is set OFF when the discard target is exceeded by the discard count, wherein the computation result holding table is searchable with use of an output port number as an address.

\* \* \* \* \*